(12) United States Patent
Foltin (10) Patent No.: US 11,046,272 B2
(45) Date of Patent: Jun. 29, 2021

(54) METHOD AND DEVICE FOR ENABLING A DRIVING ASSISTANCE FUNCTION AFTER AN ACCIDENT OF A VEHICLE

(71) Applicant: Robert Bosch GmbH, Stuttgart (DE)

(72) Inventor: Johannes Ludwig Foltin, Ditzingen (DE)

(73) Assignee: Robert Bosch GmbH, Stuttgart (DE)

(*) Notice: Subject to any disclaimer, the term of this patent is extended or adjusted under 35 U.S.C. 154(b) by 168 days.

(21) Appl. No.: 16/514,137

(22) Filed: Jul. 17, 2019

(65) Prior Publication Data
US 2020/0031297 A1   Jan. 30, 2020

(30) Foreign Application Priority Data

Jul. 18, 2018 (DE) .......................... 102018211934.1

(51) Int. Cl.
| | |
|---|---|
| *B60W 50/00* | (2006.01) |
| *B60R 21/013* | (2006.01) |
| *B60W 50/14* | (2020.01) |
| *B60W 50/02* | (2012.01) |
| *B60W 50/029* | (2012.01) |

(52) U.S. Cl.
CPC ....... *B60R 21/013* (2013.01); *B60W 50/0205* (2013.01); *B60W 50/029* (2013.01); *B60W 50/14* (2013.01); *B60W 2050/0215* (2013.01); *B60W 2050/0295* (2013.01); *B60W 2050/143* (2013.01)

(58) Field of Classification Search
CPC ......... A61B 5/684; A61B 5/24; A61B 5/0075; A61B 5/746; A61B 5/14551; A61B 5/02416; A61B 5/6833
See application file for complete search history.

(56) References Cited

U.S. PATENT DOCUMENTS

| | | | |
|---|---|---|---|
| 2014/0316227 A1* | 10/2014 | Rake | A61B 5/6893 600/323 |
| 2017/0318360 A1* | 11/2017 | Tran | B33Y 80/00 |
| 2019/0200940 A1* | 7/2019 | Osorio | A61B 5/1118 |

FOREIGN PATENT DOCUMENTS

| | | |
|---|---|---|
| DE | 102013208735 A1 | 11/2014 |
| DE | 102014008350 A1 | 11/2014 |
| DE | 102016213329 A1 | 1/2018 |

* cited by examiner

*Primary Examiner* — Ian Jen
(74) *Attorney, Agent, or Firm* — Norton Rose Fulbright US LLP; Gerard Messina

(57) ABSTRACT

A method for enabling a driving assistance function after an accident of a vehicle. The method initially including a reading-in step, in which at least one crash signal, as well as sensor data of at least one vehicle sensor and/or actuator data of at least one vehicle actuator, are read in. The reading-in step is executed while the vehicle is driven with the driving assistance function switched off. The method further includes processing the read-in sensor data and/or actuator data to determine a deviation from expected sensor data and/or expected actuator data; the processing then being carried out, if the crash signal signals an accident that has occurred. The method includes enabling the driving assistance function and/or the vehicle actuator, if the sensor data and/or the actuator data fulfill an enabling criterion within a predetermined time window and/or within a predetermined travel route of the vehicle.

10 Claims, 6 Drawing Sheets

METHOD AND DEVICE FOR ENABLING A DRIVING ASSISTANCE FUNCTION AFTER AN ACCIDENT OF A VEHICLE

CROSS REFERENCE

The present application claims the benefit under 35 U.S.C. § 119 of German Patent No. DE 102018211934.1 filed on Jul. 18, 2018, which is expressly incorporated herein by reference in its entirety.

BACKGROUND INFORMATION

The present invention relates to a device and a method. A computer program also constitutes the subject matter of the present invention.

Driving assistance functions, such as park pilot, garage pilot, highway pilot and/or traffic-jam pilot, are intended to reduce the workload of the driver and reduce collisions with the aid of a defensive driving style and resistance to turning off. However, it is problematic if, after a small accident, vehicle sensors are no longer calibrated and therefore supply unreliable sensor values. In the same way, it may be problematic if vehicle actuators, such as an actuator for the steering system, are no longer calibrated after a small accident and take on unreliable settings.

SUMMARY

In accordance with the present invention, an example method is provided for enabling a driving assistance function after an accident of a vehicle. In addition, an example device, which utilizes this method, and finally, a corresponding computer program are also provided. Advantageous further refinements and improvements of the example device are rendered possible by the measures described herein.

In accordance with the present invention, in order to enable and/or re-enable a driving assistance function after an accident of a vehicle and/or after an instance of misalignment of at least one vehicle sensor and/or vehicle actuator, a driving maneuver is carried out by the vehicle on a predetermined route and/or in a predetermined time window; it being simultaneously checked if the sensor data of the at least one vehicle sensor and/or settings of at least one vehicle actuator fulfill an enabling criterion.

A method for enabling a driving assistance function after an accident of a vehicle is put forward, the method including the following steps:

reading in at least one crash signal, as well as sensor data of at least one vehicle sensor and/or actuator data of at least one vehicle actuator; the crash signal representing an accident that has occurred; the reading-in step being carried out while the vehicle is driven with a switched-off or deactivated driving assistance function;

processing the sensor data, in order to determine a deviation from expected sensor data and/or expected actuator data; the processing being carried out, if the crash signal signals an accident that has occurred; and enabling the driving assistance function and/or the vehicle actuator, if the sensor data and/or the actuator data fulfill an enabling criterion within a predetermined time window and/or within a predetermined path of travel of the vehicle.

A driving assistance function may be, for example, a piloted and/or assisted driving function of a vehicle, which is executed, in particular, by supplementary electronic devices, such as vehicle sensors, in order to assist the driver in certain driving situations. In this connection, for example, safety aspects, but also an increase in riding comfort, are in the fore. Thus, driving assistance systems sense the surroundings of a vehicle and interpret them with the aid of surround sensors, such as cameras and/or radar sensors. Therefore, driving assistance functions aid the driver in driving situations, for example, in critical situations, in which rapid and safe action is necessary, and consequently allow more stress-free and more comfortable driving. An accident may be understood, for example, as a road traffic accident, in which damage has occurred in road traffic. Thus, a road traffic accident may be, for example, a collision of a first vehicle with a second and/or a plurality of further vehicles, and/or a collision of a vehicle with an obstacle on a roadway, and/or the vehicle's leaving a roadway, and/or a collision of a vehicle with an obstacle outside of a roadway, also referred to as offroad. Most (lesser) damage occurs during offroad trips, possibly due to the frequency of obstacles on the path, such as protruding bushes and hanging branches. A vehicle may be a vehicle for transporting persons, such as a vehicle traveling in a highly automated manner. Sensor data may be understood to be data, which are outputted, for example, by a vehicle sensor, such as a camera and/or a radar sensor and/or a lidar sensor and/or an ultrasonic sensor. Thus, these data may include, for example, information about locating an object, a person and/or an infrastructure feature in the surroundings of a vehicle. A vehicle sensor may be, for example, a detecting, technical component of a vehicle, which may measure particular physical characteristics of the surroundings of a vehicle and convert them to an electrical signal capable of being processed further. Thus, a vehicle sensor may be a camera and/or a radar sensor; a number of driving maneuvers being able to be executed on the basis of the acquired environmental data of the vehicle sensor. Actuator data may be understood as data, which are supplied by a vehicle actuator. A vehicle actuator may be understood as an active element of the vehicle, which causes or controls a mechanical movement of a vehicle component or an electrical action of a vehicle component and, through this, for example, supports or enables a driving assistance function. An enabling criterion may be understood to be, for example, a user-independent condition and/or requirement for enabling a switched-off driving assistance function of a vehicle. For example, an enabling criterion may be satisfied, if the sensor data deviate from the expected sensor data by no more than a tolerance value. For example, the tolerance value may correspond to a value of ten percent of the expected sensor data. In this connection, whether or not this condition and/or requirement is satisfied, may be determined, for example, from the processing of sensor data of a vehicle sensor and/or a number of vehicle sensors in the form of a comparison of the measurement data. In this case, for example, data of different sensors may be cross-checked.

In an accident, the vehicle actuator having connected elements, e.g., a servomotor of a steering system having a connected steering column and wheel suspension, may be damaged, as well. Thus, in the event of bumping a curb, the wheel may be turned sharply by external forces, which may cause damage to the controller and/or actuator. However, assistance systems and vehicles traveling in a piloted manner need effectively functioning and reliable controllers, in order to be able to follow the desired trajectory as accurately as possible. After a minor accident, it is preferable for the actuator and controller to be checked, as well. Since the comparison of the actuator to the selected setpoint may be carried out, using sensor data, as well, enabling and/or free measurement of the actuator may also take place after an accident. In this connection, e.g., data of the vehicle actuator, such as a steering wheel angle (in the case of a steering assistance system as a vehicle actuator) may be selected as actuator data and compared to a measured yaw rate and speed and/or expected actuator data, in order to compare a steering wheel angle to an actual steering angle. In this manner, the operability of the "steering actuator" may also be checked, using sensor values, whereupon, for example, the actuator may be enabled, if the actuator data are at a predetermined ratio to the enabling criterion.

Vehicles having driver assistance systems may also be controlled manually, depending on the form. This is the case, in particular, if they are intended to be operated outside of the operative range specified for the drive pilot. Thus, for example, a vehicle having a traffic-jam pilot function may also be driven manually on a highway not having a traffic jam, and a vehicle having a highway pilot function may also be driven in the city, in a parking lot. As soon as the vehicle is driven manually, a driver of the vehicle may possibly be prone to making errors. Thus, with a manually operated vehicle, both smaller and larger automobile accidents, such as so-called taps while parking, may occur. In some instances, a vehicle owner does not have parking taps, as well as other light damage to the vehicle, such as visible paint damage, repaired immediately, or possibly does not have them repaired at all, since a visit to a garage may quickly become expensive, particularly in the case of technically well-equipped vehicles.

Thus, advantages of the approach of the method put forward here include, for example, that after an accident of a vehicle and/or an instance of misalignment of a vehicle sensor, a driving assistance function is capable of being enabled, without the vehicle owner's needing, for example, to have the driver assistance function enabled at a garage. In this case, enabling or re-enabling of the driver assistance system may be carried out independently of an accident. Therefore, using the approach put forward here, it may be ensured particularly effectively, that, for example, during the production of the vehicle, a vehicle sensor is correctly mounted and that manufacturing tolerances have been sufficiently maintained. In addition, by implementing the approach on an external processing unit, such as in a cloud, the load on the vehicle may be reduced, and resources may be used for other vehicle functions. Furthermore, enabling of the driver assistance function with the aid of an external processing unit may also be provided, for example, more reasonably than in the case of a visit to a garage for enabling the driving assistance function.

According to a further specific embodiment, in the processing step, a misaligned vehicle sensor may be detected, if an ascertained direction-of-view value of the at least one vehicle sensor lies outside of a predefined angular tolerance range. Even in the case of supposedly minor damage to a vehicle, sensor mounting brackets may possibly be damaged, and/or the connections may be loosened, which means that the vehicle sensor fastened to such a mounting bracket is no longer oriented reliably in a direction of view. Such a predefined angular tolerance range with regard to the expected direction of view may be, for example, an angular range of 5 or 10 degrees, by which the vehicle sensor identified as misaligned may deviate from the expected direction of view. It is also conceivable for the angular tolerance range to be able to be a function of the specific orientation of the other sensors, as well. Thus, a direction of view may also be a direction of view relative to a direction of view of a second sensor. In this manner, it may be ensured, for example, that a sufficiently large overlapping range of sensors and/or sufficiently large range of coverage of the surroundings is ensured. Such a deviation of the direction of view of the vehicle sensor identified as misaligned may be ascertained, for example, by a comparison with sensor values of further sensors of the vehicle. For example, by evaluating a reference point in the vehicle surroundings recorded by a vehicle camera, a course of a road or roadway or a traffic sign, which is not reproducible by a radar sensor identified as misaligned, may be detected by the vehicle. Consequently, such a specific embodiment of the approach put forward here provides the advantage, that by calibrating a misaligned vehicle sensor, rapid and uncomplicated enabling and/or re-enabling of a driving assistance function may be rendered possible.

According to one specific embodiment, in the processing step, the vehicle sensor identified as misaligned may be calibrated during a trip on a predetermined route, while a driving assistance function is switched off; in the enabling step, the driving assistance function of the vehicle being re-enabled to use measured values of the calibrated vehicle sensor. Superficial damage to a vehicle sensor and associated misalignment of the vehicle sensor may, for example, negatively affect a measurement of the vehicle surroundings and, therefore, the execution of a driving assistance function. Thus, for example, a malfunction in the optical path of a camera may affect classification results of objects, persons and/or infrastructure features in the vehicle surroundings and/or affect projecting vehicle parts or distortions of the characteristics of a radar sensor. Therefore, such a specific embodiment of the approach put forward here provides the advantage, that during a predetermined, manual trip of the vehicle or one with a low degree of automation, free measurement of sensor data and their processing for ascertaining a possible deviation of the ascertained sensor data from expected sensor data allows an additional degree of safety in the enabling and/or re-enabling of the driver assistance function. In comparison with a low degree of automation of the driving assistance function, a pilot in the form of a driving system for autonomous driving has very high standards regarding availability and should therefore automatically continue and accept responsibility for the trip for a certain period of time, for example, 10 seconds. In an assistance system, the driver should monitor this and always be ready to override the system, etc. Here, the demands on the technical system dependent on the "human fallback level" are less than in the case of a pilot. This means that one may travel in an automated manner, using an assistant (monitored by persons), and due to this, the sensors may "run freely," but also the actuators may "run freely" with electrical regulation.

In addition, the processing step and/or the enabling step may be executed as a function of a traveled speed of the vehicle with a switched-off driving assistance function. Thus, for example, a traffic-jam pilot function may be enabled, when a driver driving manually is traveling 70 km/h. In this connection, a highway pilot function may only be enabled as of a manually driven speed of, e.g., 130 km/h. In this manner, it may be ensured that air pressure acting upon the vehicle does not have any negative effects. By measuring and compensating for the wind speed, then, at lower speed or, in the case of a tail wind, at higher speed, the driving assistance function may also be enabled, since the vehicle has already reached the setpoint head wind. In addition, a route to be predetermined and/or a time window to be predetermined, on or in which the sensor data are processed, may, in this case, be predetermined, for example, with the aid of the targeted driving assistance function, as well. For example, a traffic-jam pilot function may be enabled earlier than a highway pilot function, since in this case, traveling is being done at lower speeds, and a lower relative speed is to be expected. In the same way, an assistant, which is intended to be monitored by the driver, may be enabled earlier than a pilot. Such a specific embodiment of the approach put forward here provides the advantage, that consequently, individual functions of a driving assistance function may be enabled and/or re-enabled as a function of a manually driven speed in a simple and uncomplicated manner.

In addition to, or as an alternative to, a predetermined route and/or a predetermined time window, a driving assistance function may also be enabled and/or re-enabled as a function of another predetermined driving situation, which excites a vehicle sensor differently from, for example, a trip of the vehicle on a straight-line route. Thus, for example, a minimum acceleration may be specified, and sensor data may be acquired and processed prior to, during and/or after the acceleration of the vehicle. Thus, in addition, besides a longitudinal acceleration, a minimum transverse acceleration of the vehicle during cornering may also be considered. In addition to the actual driving of the vehicle, an inclination of the road may also be considered and/or required for enabling the driving assistance function. Short-term accelerations, such as on a poor roadway or in response to running over a small object such as a small rock, may also be used and/or required for enabling a driving assistance function. Such a specific embodiment of the approach put forward here provides the advantage, that with the aid of a vibration during acceleration of the vehicle, a rigidity and/or stability of the connection and alignment of a vehicle sensor may be checked. In the case of short-term excitations, such as in response to running over a lowered curb, e.g., a vibration response of the vehicle sensor may also be analyzed.

According to one specific embodiment, the processing step and/or the enabling step may be executed as a function of an object detection rate of the at least one vehicle sensor, with the driving assistance function switched off; in this case, the object detection rate being intended to be at least 90 percent. The enabling of a driving assistance function may also be a function of the presence of expected objects, persons and/or infrastructure features, on a predetermined route and/or within a predetermined time window, in order to be able to evaluate the detection performance of the vehicle sensor. For example, a driving assistance function may be enabled on the highway, if a vehicle sensor is able to detect and classify a predefined number of passenger cars, motorcycles and/or cargo trucks at a high degree of accuracy. Such a specific embodiment of the approach put forward here provides the advantage, that in the case of a high detection rate of the vehicle sensor, it may be assumed that the vehicle sensor is correctly aligned, so that the driving assistance function may be enabled and executed safely.

In addition, according to one specific embodiment, the processing step and/or the enabling step may be executed as a function of at least one requested driving maneuver executed by the driver of the vehicle. Thus, for example, a type of inspection catalog may be indicated to the driver on a display and/or a monitor in the vehicle interior; it being necessary to perform the driving maneuvers that are requested, for example, in this inspection catalog and are to be executed by the driver of the vehicle, in order to enable the driving assistance function. For example, heavy braking with a predetermined deceleration, turning the steering wheel by a predetermined steering-wheel angle, or accelerating to a predetermined speed may constitute such a driving maneuver. In this connection, the inspection catalog may be constructed as a virtual checklist with check marks and/or take the form of gamification. Such a specific embodiment of the approach put forward here provides the advantage, that a driver may assume an active role as a virtual player, to the effect that he/she is involved in a more engaged and emotional manner in the method for enabling the driving assistance function.

According to a further specific embodiment, in the reading-in step, an information item regarding the location of impact of an object with the vehicle may also be read in and/or extracted from the crash signal; in the enabling step, a driving assistance function being enabled independently of the enabling criterion; the driving assistance function being based on sensor data, which are supplied by a vehicle sensor that is positioned outside of a tolerance range about the location of impact on the vehicle. In this case, enabling of the driving assistance function may be limited, for example, to a vehicle sensor damaged in a low-impact collision. Thus, for example, the affected region or the location of impact on the vehicle may be ascertained with the aid of surround sensors and/or crash sensors. Such a specific embodiment of the approach put forward here provides the advantage, that a duration of the test for enabling a driving assistance function may be reduced, for example, and/or the duration of the test for relevant functions may be limited. Thus, for example, in the case of a low-impact collision at the left side of the vehicle rear end, processing of sensor data and/or calibration of a vehicle sensor, which is positioned at the front part of the vehicle, may be omitted, which means that it is possible for the driving assistance function, which is based, for example, predominantly or exclusively on the front sensor data, to be enabled and/or re-enabled more rapidly.

Finally, according to one specific embodiment, the reading-in step and/or the processing step and/or the enabling step may be executed on a processing unit outside of the vehicle; the driver assistance function being enabled, using an enabling signal supplied by the processing unit outside of the vehicle. Such a specific embodiment of the approach put forward here provides the advantage, that the vehicle may also supply, for example, processed sensor data, and that these sensor data may be evaluated outside of the vehicle on more powerful computers. In addition, the processing of data in a processing unit outside of the vehicle may mean, for example, a lower computational requirement in the vehicle itself, which allows less power to be consumed and/or the option of using resources for other functions.

The example method put forward here, of enabling a driving assistance function after an accident of a vehicle, may be implemented, for example, as software or hardware or as a mixture of software and hardware, in, for example, a control unit.

In addition, the present invention put forward here provides a device, which is configured to perform, control and/or implement, in corresponding devices, the steps of a variant of a method put forward here, for enabling a driving assistance function after an accident of a vehicle. The object of the present invention may also be achieved rapidly and efficiently by this embodiment variant of the invention in the form of a device.

To this end, the device may include at least one processing unit for processing signals or data, at least one storage unit for storing signals or data, at least one interface to a sensor or an actuator for reading in sensor signals from the sensor or for outputting data signals or control signals to the actuator, and/or at least one communications interface for reading in or outputting data, which are embedded in a communications protocol. The processing unit may be, for example, a signal processor, a microcontroller or the like; the storage unit being able to be a flash memory, an EEPROM or a magnetic storage unit. The communications interface may be configured to read in or output data wirelessly and/or in a line-conducted manner; a communications interface, which is able to read in or output the line-conducted data, being able to read in these data, e.g., electrically or optically, from a corresponding transmission line or to output them to a corresponding data transmission line.

In the case at hand, a device may be understood to be an electrical device, which processes sensor signals and outputs control and/or data signals as a function of them. The device may include an interface, which may be implemented as hardware and/or software. In a hardware design, the interfaces may, for example, be part of a so-called system ASIC, which includes various functions of the device. However, it is also possible for the interfaces to be separate, integrated circuits or to be at least partially made up of discrete components. In a software design, the interfaces may be software modules that are present, for example, in a microcontroller, next to other software modules.

A computer program product or computer program including program code, which may be stored in a machine-readable carrier or storage medium, such as a solid state memory, a hard disk storage device or an optical storage device and is used for performing, implementing and/or controlling the steps of the method according to one of the above-described specific embodiments, in particular, when the program product or program is executed on a computer or a device.

Exemplary embodiments of the present invention put forward here are illustrated in the figures and explained in greater detail below.

DETAILED DESCRIPTION OF EXAMPLE EMBODIMENTS

In the following description of preferred exemplary embodiments of the present invention, the same or similar reference numerals are used for the elements that are shown in the different figures and function similarly, in which case a repeated description of these elements is omitted.

Figure 1:
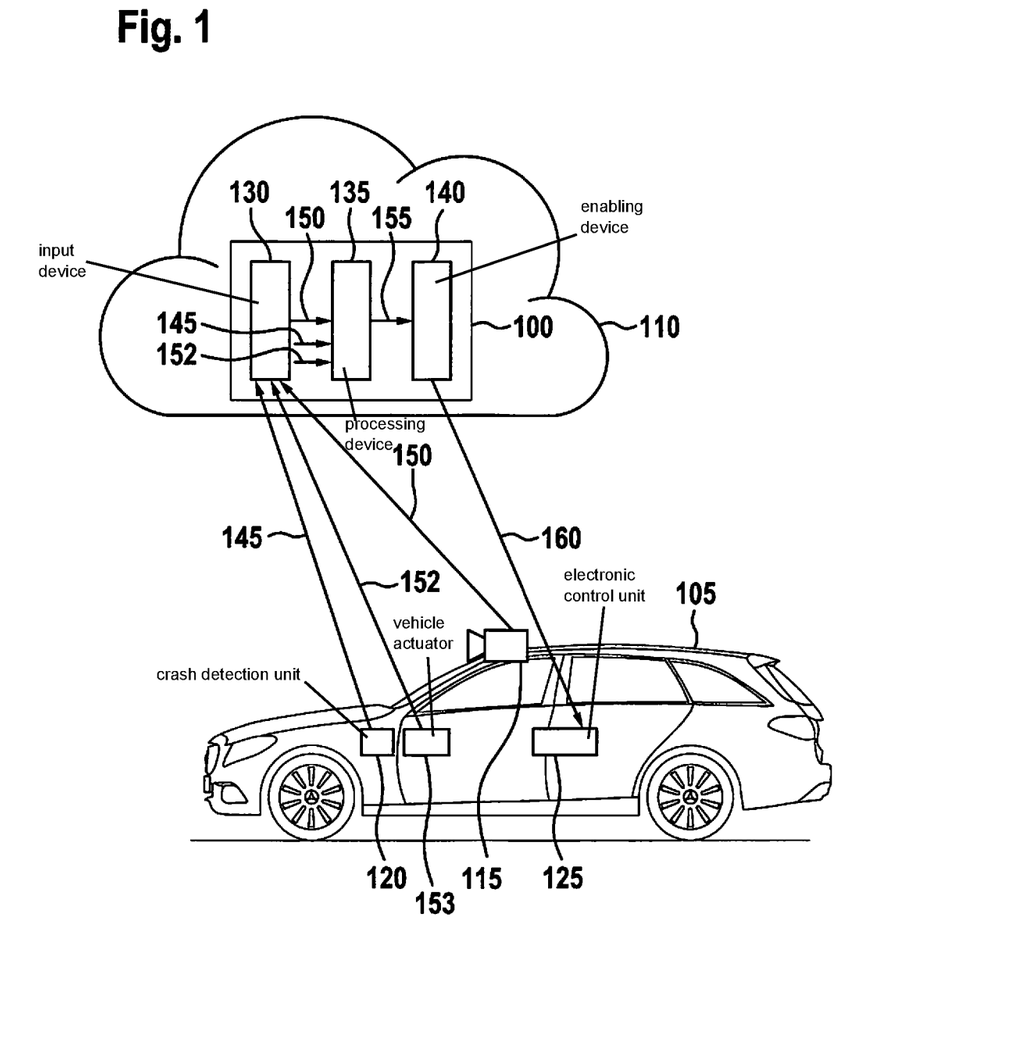
FIG. 1 shows a block diagram of a device for enabling a driving assistance function after an accident of a vehicle, according to an exemplary embodiment.

FIG. 1 shows a block diagram of a device 100 for enabling a driving assistance function after an accident of a vehicle 105, according to an exemplary embodiment. According to one exemplary embodiment, device 100 is situated, in this case, on an external processing unit 110, which, in this instance, is illustratively represented as a cloud. Additionally or alternatively, however, device 100 may also be situated on the vehicle 105 itself. By way of example, vehicle 105 includes a vehicle sensor 115, a crash detection unit 120, as well as an electronic control unit 125. In this case, vehicle sensor 115 is depicted, for example, as a front driving camera 115. In addition, or alternatively, vehicle sensor 115 may also be a radar sensor and/or an ultrasonic sensor. Front driving camera 115 is situated in the front region of vehicle 105 and is configured to transmit recorded images in real time to the interior of vehicle 105, onto an indicating device, for example, a display or a monitor, so that the driver retains an overview of the actions in front of vehicle 105. According to one exemplary embodiment, the crash detection unit 120 is used for detecting an accident of vehicle 105; in this connection, crash detection unit 120 being configured to monitor vehicle sensor 115, in order to determine if a collision has occurred. According to one exemplary embodiment, electronic control unit 125 of vehicle 105 is configured to activate, as well as switch off or deactivate, a driving assistance function; for example, the driving assistance function being switched off or deactivated after an accident of vehicle 105. In addition, it is also possible for the assistance function to be shut off completely, so that only the (raw) sensor data are analyzed. However, it is also possible for the assistance function to run and compute, but for the further path to the actuator system/display to be switched off. During software updates, these principles are often implemented "over the air," in order to be able to analyze the basic performance of the function without having to undertake a real action.

Device 100 includes, by way of example, an input device 130, a processing device 135, as well as an enabling device 140. Alternatively, input device 130 or processing device 135 or enabling device 140, or input device 130 and processing device 135, or input device 130 and enabling device 140, or processing device 135 and enabling device 140, may also be situated on vehicle 105.

Input device 130 is initially configured to read in at least one crash signal 145 supplied by crash detection unit 120; crash signal 145 representing an accident of vehicle 105 that has occurred. Input device 130 is also configured to read in sensor data 150 from the at least one vehicle sensor 115 of vehicle 105 and/or actuator data 152 from at least one vehicle actuator 153 of vehicle 105. According to one exemplary embodiment, input device 130 is configured to read in crash signal 145, as well as sensor data 150 and/or actuator data 152, in particular, while vehicle 105 is driven with the driving assistance function switched off. In the following, processing unit 135 is configured to process read-in sensor data 150 and/or actuator data 152 from at least one vehicle actuator 153, in order to determine a deviation of sensor data 150 from expected sensor data and/or expected actuator data; processing device 135 then operating, when crash signal 145 signals an accident that has occurred. Processing device 135 is further configured to supply a deviation signal 155, which represents an enabling criterion, to enabling device 140. Enabling device 140 is now configured to enable the driving assistance function, if sensor data 150 and/or the actuator data fulfill the enabling criterion within a predetermined time window and/or within a predetermined route of travel of vehicle 105. The driving assistance function is finally enabled, using an enabling signal 160 supplied by enabling device 140 to electronic control unit 125 of vehicle 105.

Figure 2:
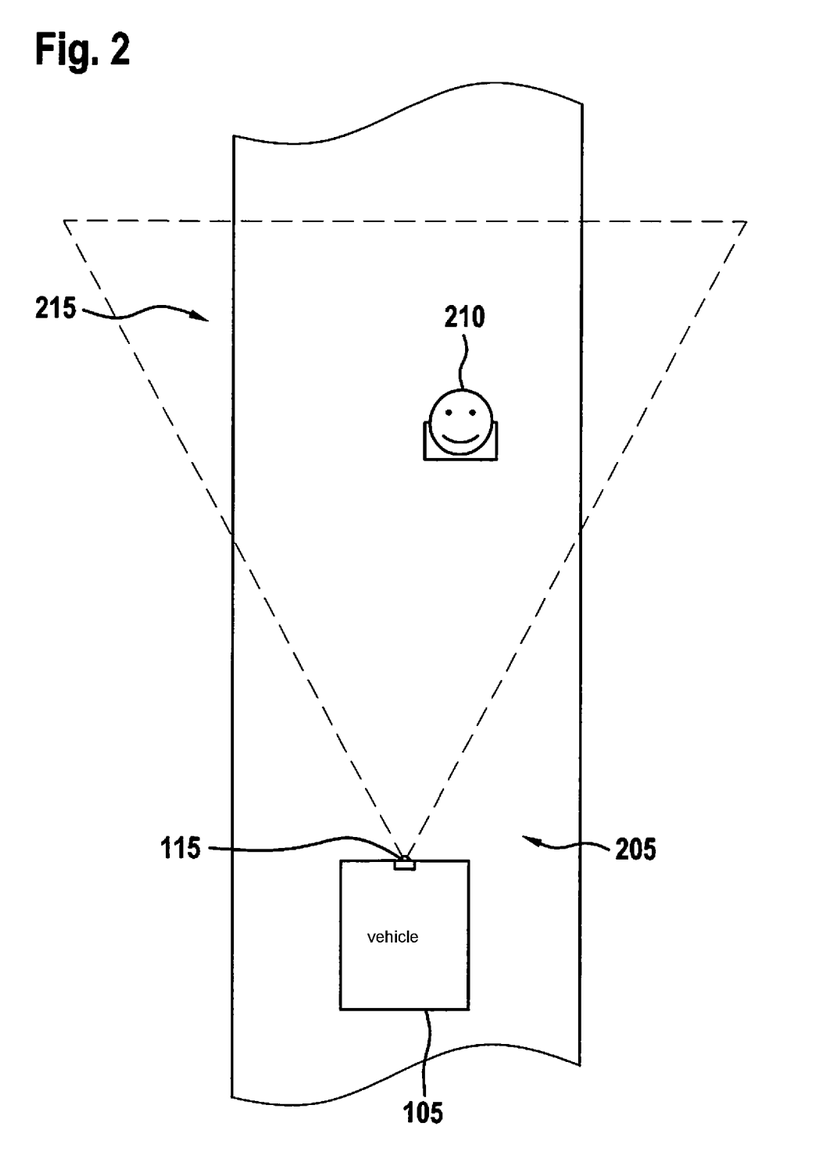
FIG. 2 shows a schematic view of a driving situation of a vehicle having a switched-on driving assistance function, according to an exemplary embodiment.

FIG. 2 shows a schematic view of a driving situation of a vehicle 105 having a switched-on driving assistance function, according to an exemplary embodiment. In this case, a vehicle 105 traveling on a roadway 205 is depicted in the view; vehicle 105 including a vehicle sensor 115, which is, for example, a front driving camera 115. In addition, an object 210 is located on roadway 205; the object 210 being, for example, a person 210, who is situated in a detecting range 215 of vehicle sensor 115.

According to one exemplary embodiment, vehicle 105 executes a driving assistance function and is, by way of example, in an autopilot mode. In this connection, an automatic driving mode, which guides vehicle 105 automatically by request, without the driver's needing to intervene in the control while the autopilot mode is active, may be referred to as an autopilot mode. The driving assistant function is executed, for example, in an electronic control unit of vehicle 105, which processes the environmental signals of vehicle sensor 115, in order to ascertain how vehicle 105 should be controlled. From the driving situation depicted here, it becomes clear that vehicle sensor 115 is mounted correctly on vehicle 105, and that vehicle sensor 115 does not need to be calibrated. Accordingly, the driving assistance function of vehicle 105 may be executed without hesitation.

Figure 3:
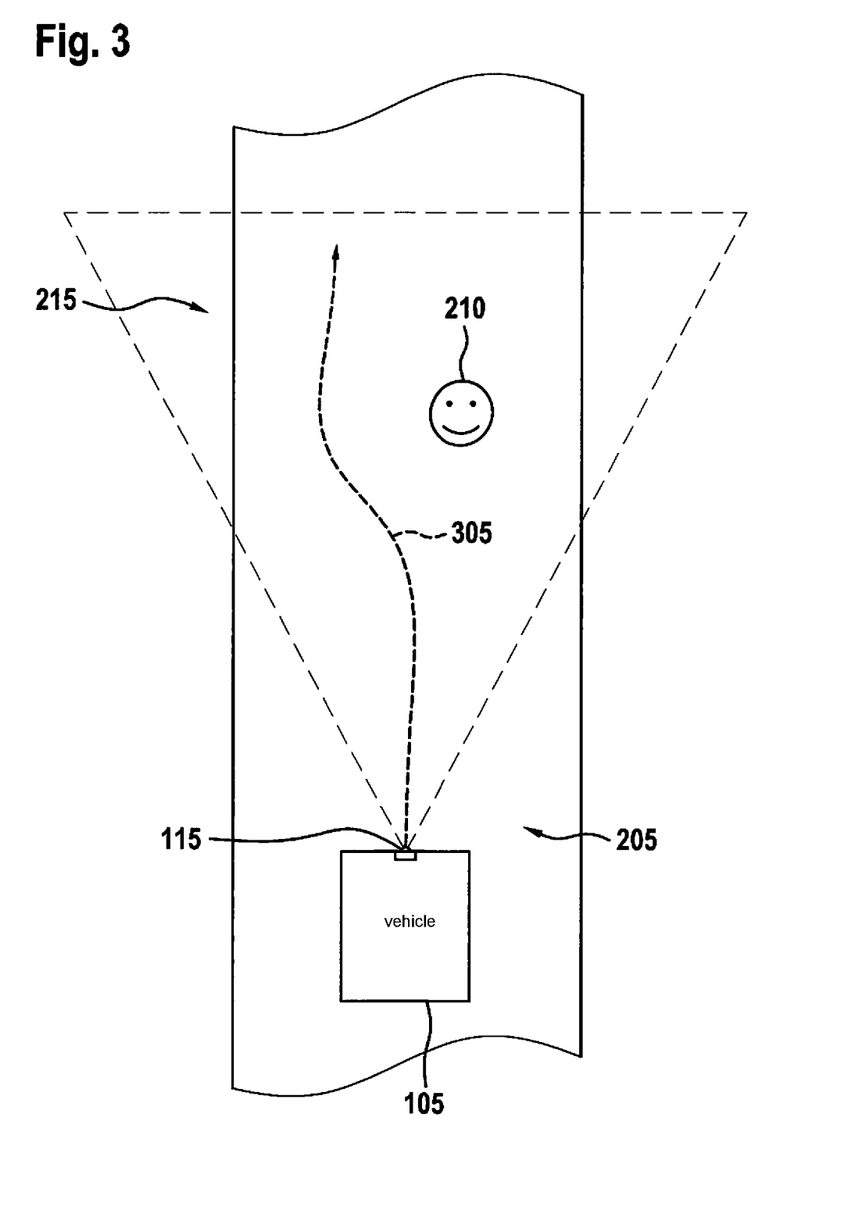
FIG. 3 shows a schematic view of a driving situation of a vehicle having a switched-on driving assistance function, according to an exemplary embodiment.

FIG. 3 shows a schematic view of a driving situation of a vehicle 105 having a switched-on driving assistance function, according to an exemplary embodiment. In this connection, the view depicted constitutes an internal representation of the driving situation from FIG. 2, including an assumed detecting range 215 of vehicle sensor 115. Thus, the vehicle 105, which is traveling on roadway 205 and has the vehicle sensor 115 positioned in the front region of vehicle 105, is also shown in this view. In addition, person 210, who is located in detecting range 215 of vehicle sensor 115, is situated on roadway 205.

According to one exemplary embodiment, vehicle 105 executes a driving assistance function and is, by way of example, in an autopilot mode. In this connection, an automatic driving mode, which guides vehicle 105 automatically by request, without the driver's needing to intervene in the control while the autopilot mode is active, may be referred to as an autopilot mode. The driving assistant function is executed, for example, in an electronic control unit of vehicle 105, which processes the environmental signals of vehicle sensor 115, in order to ascertain how vehicle 105 should be controlled. Accordingly, since vehicle sensor 115 is correctly mounted to vehicle 105, the driver assistance function of vehicle 105 may be executed without hesitation. Thus, a travel trajectory 305 of vehicle 105 to be driven, which has been ascertained by the driving assistance function, and which vehicle 105 is to follow in order to evade person 105, so that a crash or a collision of vehicle 105 with person 210 is prevented, is represented in the view depicted here.

Figure 4:
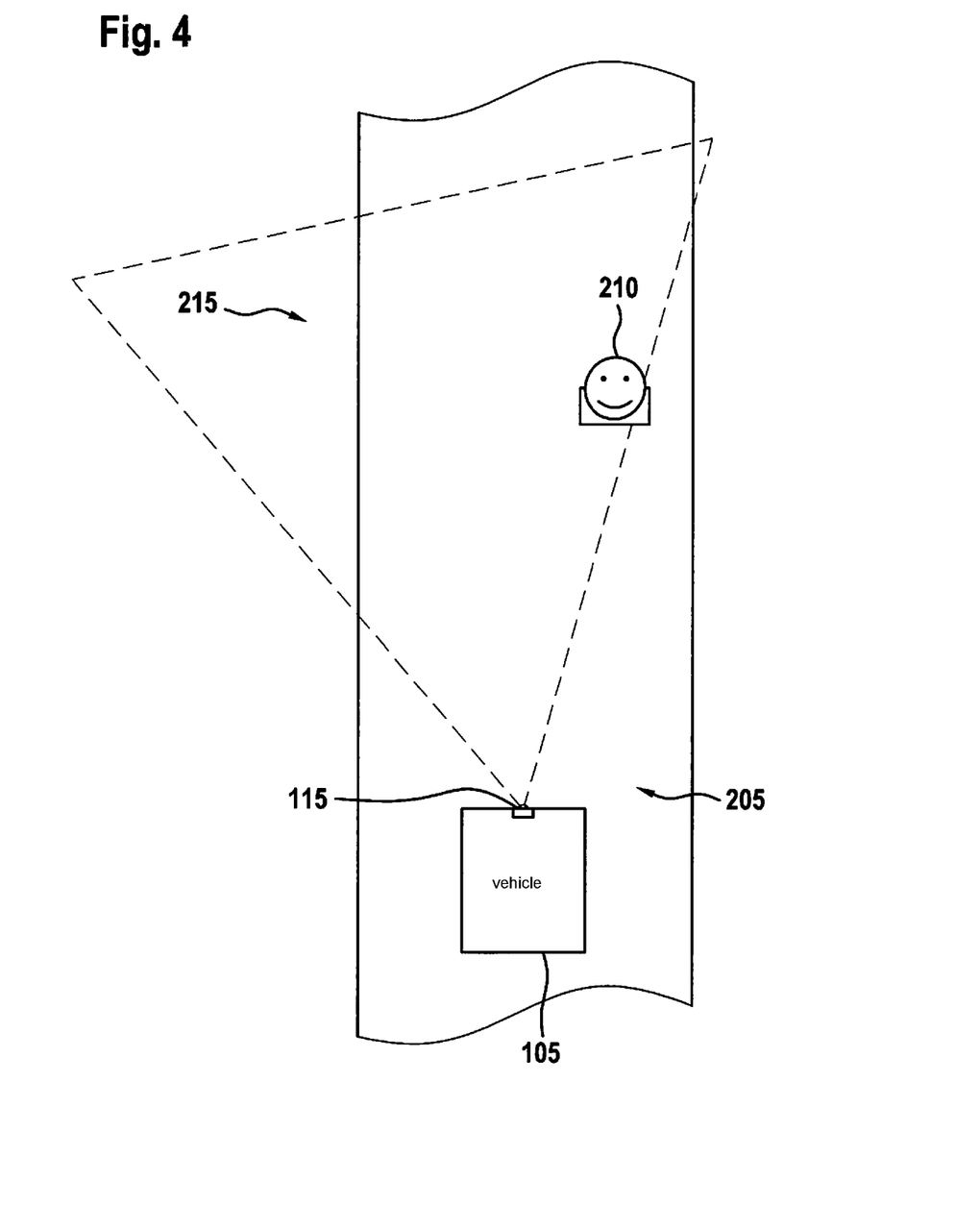
FIG. 4 shows a schematic view of a driving situation of a vehicle having a switched-on driving assistance function, after an instance of misalignment of a vehicle sensor, according to an exemplary embodiment.

FIG. 4 shows a schematic view of a driving situation of a vehicle 105 having a switched-on driving assistance function, after an instance of misalignment of a vehicle sensor 115, according to an exemplary embodiment. In this case, a vehicle 105 traveling on a roadway 205 is depicted in the view; vehicle 105 including a vehicle sensor 115, which is, for example, a front driving camera 115. In addition, an object 210 is located on roadway 205; the object 210 being, for example, a person 210, who is situated in a detecting range 215 of vehicle sensor 115.

As can be recognized in the view, detecting range 215 of vehicle sensor 115 is displaced in comparison with FIG. 2 and FIG. 3. The reason for this is a misalignment of vehicle sensor 115, for example, due to an accident, which means that a direction-of-view value of vehicle sensor 115 now lies outside of an angular tolerance. Thus, in spite of a defensive driving style of the driving assistance function, vehicle 105 may be involved in an accident, since in addition to the vehicles 105 traveling with the aid of a driving assistance function, human drivers are also on the move, who, due to fatigue, for example, make mistakes that sometimes may not be caught by the driving assistance function, depending on the traffic situation. Alternatively or additionally, misalignment of vehicle sensor 115 may, however, also be a result of inaccurate first-time calibration of vehicle sensor 115 and/or may be caused by fluctuating temperature influences or general aging effects.

A slightly inaccurate installation position and/or orientation of vehicle sensor 115 may be corrected by calibrating vehicle sensor 115. To that end, sensor data of vehicle sensor 115 are acquired within a predetermined time interval and/or within a predetermined route and compared to expected sensor data and/or a model stored in a vehicle storage device. Thus, it may be assumed that if vehicle 105 travels, for example, on a highway, it travels straight ahead, which means that a vehicle driving ahead is, on average, always detectable in the middle of roadway 205. If a systematic displacement of vehicle sensor 115 to the right occurs, then this means that detecting range 215 of vehicle sensor 115 is directed to the left. If the magnitude of the displacement does not correspond to the expected displacement, it is to be assumed that vehicle sensor 115 is oriented in a direction outside of an angular tolerance.

Figure 5:
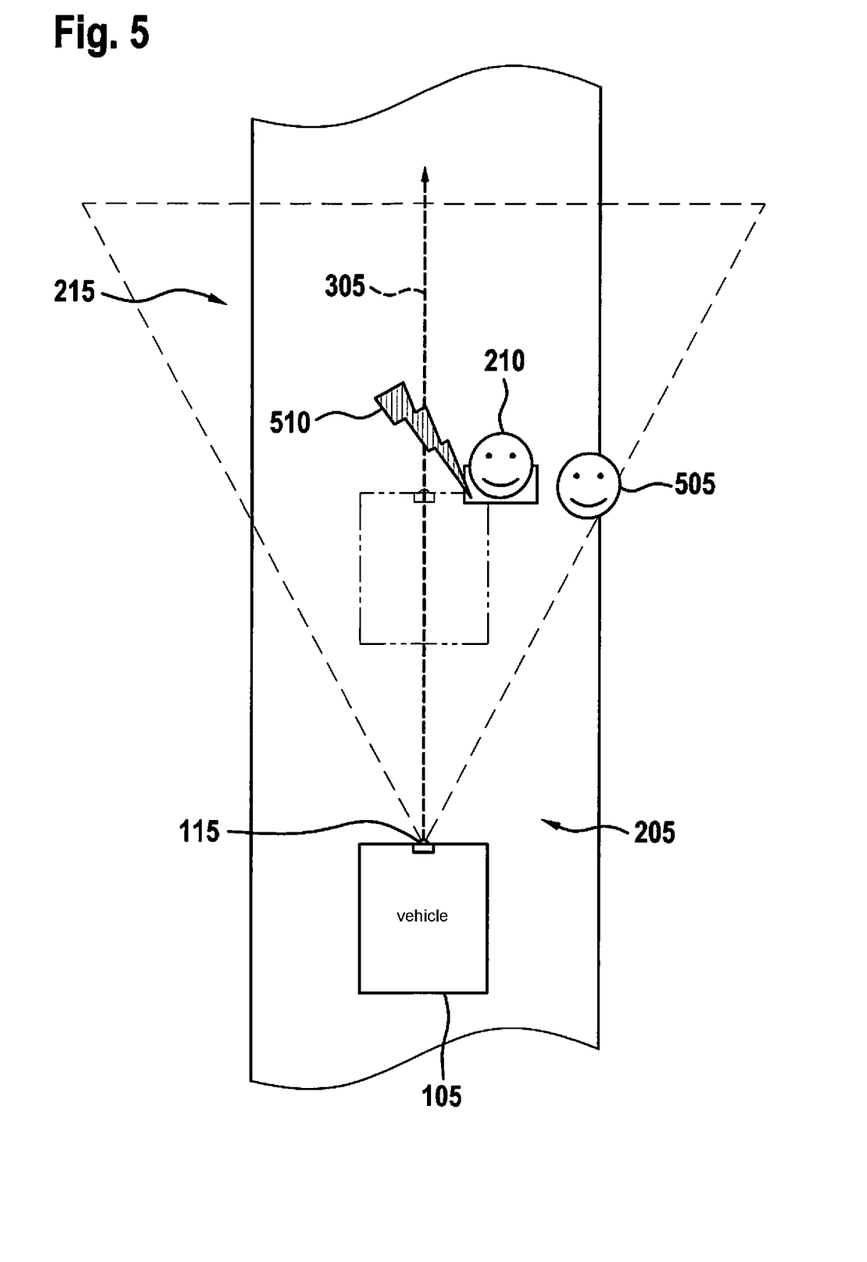
FIG. 5 shows a schematic view of a driving situation of a vehicle having a switched-on driving assistance function, after an instance of misalignment of a vehicle sensor, according to an exemplary embodiment.

FIG. 5 shows a schematic view of a driving situation of a vehicle 105 having a switched-on driving assistance function, after an instance of misalignment of a vehicle sensor 115, according to an exemplary embodiment. In this connection, the view depicted constitutes an internal representation of the driving situation from FIG. 4, including an assumed detecting range 215 of vehicle sensor 115. Thus, the vehicle 115, which is traveling on roadway 205 and has the vehicle sensor 115 positioned in the front region of vehicle 105, is also shown in this view. In addition, person 210, who is located in detecting range 215 of vehicle sensor 115, is situated on roadway 205.

In this connection, a surrounding-area representation of vehicle 105 by misaligned vehicle sensor 115, assumes, for example, the correct detecting range 115 from FIG. 2 and FIG. 3, which means that the person 210 actually situated on roadway 205 is positioned in the wrong place, for example, as image 505 shown at the edge of roadway 205. As a result, the driving assistance function computes a driving maneuver or a travel trajectory 305, upon the execution of which a crash 510 or a collision 510 of vehicle 105 with person 210 would occur. Thus, as a result of an undetected instance of misalignment of a vehicle sensor 115, a deviation in the representation of the surroundings of vehicle sensor 115 occurs, along with a subsequent, incorrect driving decision by the driving assistance function of vehicle 105.

By calibrating misaligned vehicle sensor 115 after a particular deviation of the acquired sensor data of vehicle sensor 115 from expected sensor data, then, during the ascertainment of the driving situation, objects and/or persons 210 may be depicted at a correct position of the internal representation of the surroundings of the vehicle, so that an accident is prevented.

However, before the driving assistance function is enabled and/or re-enabled, sensor data of vehicle sensor 115 are acquired and compared to expected sensor data, and calibration of vehicle sensor 115 is carried out, until the sensor data satisfy an enabling criterion within a predetermined time window and/or within a predetermined path of travel of the trip of vehicle 105. In certain circumstances, this operation may also continue over several terminal cycles of vehicle 105.

Figure 6:
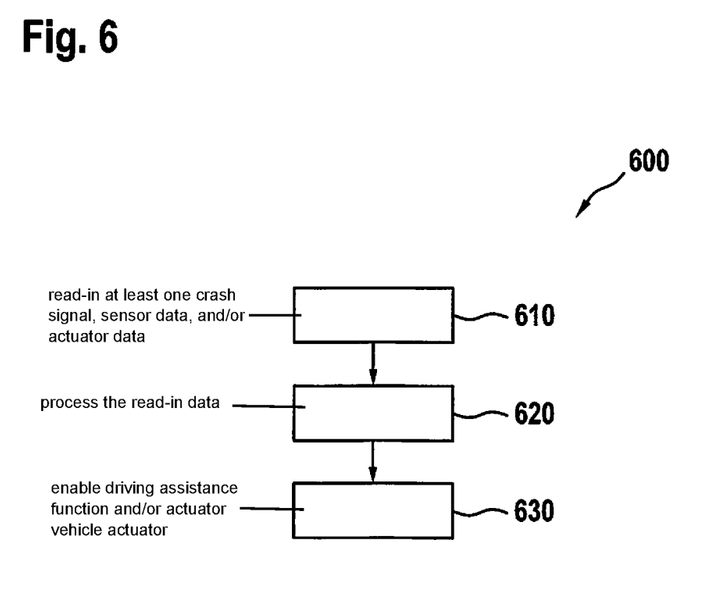
FIG. 6 shows a flow chart of an exemplary embodiment of a method for enabling a driving assistance function after an accident of a vehicle, according to an exemplary embodiment.

FIG. 6 shows a flow chart of an exemplary embodiment of a method 600 for enabling a driving assistance function after an accident of a vehicle, according to an exemplary embodiment. In this connection, the method 600 according to an exemplary embodiment may be executed on the device from FIG. 1 for enabling a driving assistance function after an accident of a vehicle.

In a step 610 of method 600, at least one crash signal, as well as sensor data of at least one vehicle sensor and/or actuator data of at least one vehicle actuator, are read in; the crash signal representing an accident that has occurred; in particular, step 610 being executed during a trip of the vehicle, with the driving assistance function switched off. In addition, in a subsequent step 620 of method 600, the sensor data are processed in order to determine a deviation of the sensor data from expected sensor data and/or expected actuator data; the processing 620 then being carried out, if the crash signal signals an accident that has occurred. Finally, the method includes a step 630, in which the driving assistance function and/or the vehicle actuator is enabled, if the sensor data and/or the actuator data fulfill an enabling criterion within a predetermined time window and/or within a predetermined path of travel of the vehicle.

If an exemplary embodiment includes an "and/or" conjunction between a first feature and a second feature, then this is to be read such that, according to one specific embodiment, the exemplary embodiment includes both the first feature and the second feature, and according to another specific embodiment, the exemplary embodiment includes either only the first feature or only the second feature.

What is claimed is:

1. A method for enabling a driving assistance function after an accident of a vehicle, comprising:
   reading in: (i) at least one crash signal, and (ii) sensor data of at least one vehicle sensor and/or actuator data of at least one vehicle actuator, the crash signal representing an accident that has occurred, wherein the reading-in is carried out while the vehicle is driven with a switched-off driving assistance function;
   processing the sensor data to determine a deviation from expected sensor data, the processing being carried out when the crash signal signals an accident that has occurred; and
   enabling the driving assistance function and/or the vehicle actuator when the sensor data and/or the actuator data fulfill an enabling criterion within a predetermined time window and/or within a predetermined path of travel of the trip of the vehicle.

2. The method as recited in claim 1, wherein in the processing step, a misaligned vehicle sensor is detected when an ascertained direction-of-view value of the at least one vehicle sensor lies outside of a predefined angular tolerance range.

3. The method as recited in claim 2, wherein in the processing step, the vehicle sensor identified as a misaligned vehicle sensor is calibrated on a trip via a predetermined route, while a driving assistance function is switched off, and in the enabling step, the driving assistance function of the vehicle being re-enabled to use measured values of the calibrated vehicle sensor.

4. The method as recited in claim 1, wherein the processing step and/or the enabling step is executed as a function of a traveled speed of the vehicle with a switched-off driving assistance function.

5. The method as recited in claim 1, wherein the processing step and/or the enabling step is executed as a function of an object detection rate of the at least one vehicle sensor with a switched-off driving assistance function, the object detection rate being at least 90 percent.

6. The method as recited in claim 1, wherein the processing step and/or the enabling step is executed as a function of at least one requested driving maneuver performed by the driver of the vehicle.

7. The method as recited in claim 1, wherein in the reading-in step, an information item regarding the location of impact of an object with the vehicle is also read in and/or extracted from the crash signal and/or vehicle sensor data immediately prior to the accident, and wherein in the enabling step, a driving assistance function is enabled independently of the enabling criterion, the driving assistance function being based on sensor data which are supplied by a vehicle sensor that is positioned outside of a tolerance range about the location of impact on the vehicle.

8. The method as recited in claim 1, wherein the reading-in step and/or the processing step and/or the enabling step are executed on a processing unit outside of the vehicle, and wherein the driver assistance function is enabled, using an enabling signal supplied by the processing unit outside of the vehicle.

9. A device configured to enable a driving assistance function after an accident of a vehicle, the device configured to:
   read in: (i) at least one crash signal, and (ii) sensor data of at least one vehicle sensor and/or actuator data of at least one vehicle actuator, the crash signal representing an accident that has occurred, wherein the reading-in is carried out while the vehicle is driven with a switched-off driving assistance function;
   process the sensor data to determine a deviation from expected sensor data, the processing being carried out when the crash signal signals an accident that has occurred; and
   enable the driving assistance function and/or the vehicle actuator when the sensor data and/or the actuator data fulfill an enabling criterion within a predetermined time window and/or within a predetermined path of travel of the trip of the vehicle.

10. A non-transitory machine-readable storage medium on which is stored a computer program for enabling a driving assistance function after an accident of a vehicle, the computer program, when executed by a computer, causing the computer to perform:
   reading in: (i) at least one crash signal, and (ii) sensor data of at least one vehicle sensor and/or actuator data of at least one vehicle actuator, the crash signal representing an accident that has occurred, wherein the reading-in is carried out while the vehicle is driven with a switched-off driving assistance function;
   processing the sensor data to determine a deviation from expected sensor data, the processing being carried out when the crash signal signals an accident that has occurred; and enabling the driving assistance function and/or the vehicle actuator when the sensor data and/or the actuator data fulfill an enabling criterion within a predetermined time window and/or within a predetermined path of travel of the trip of the vehicle.

* * * * *